Patented Sept. 29, 1942

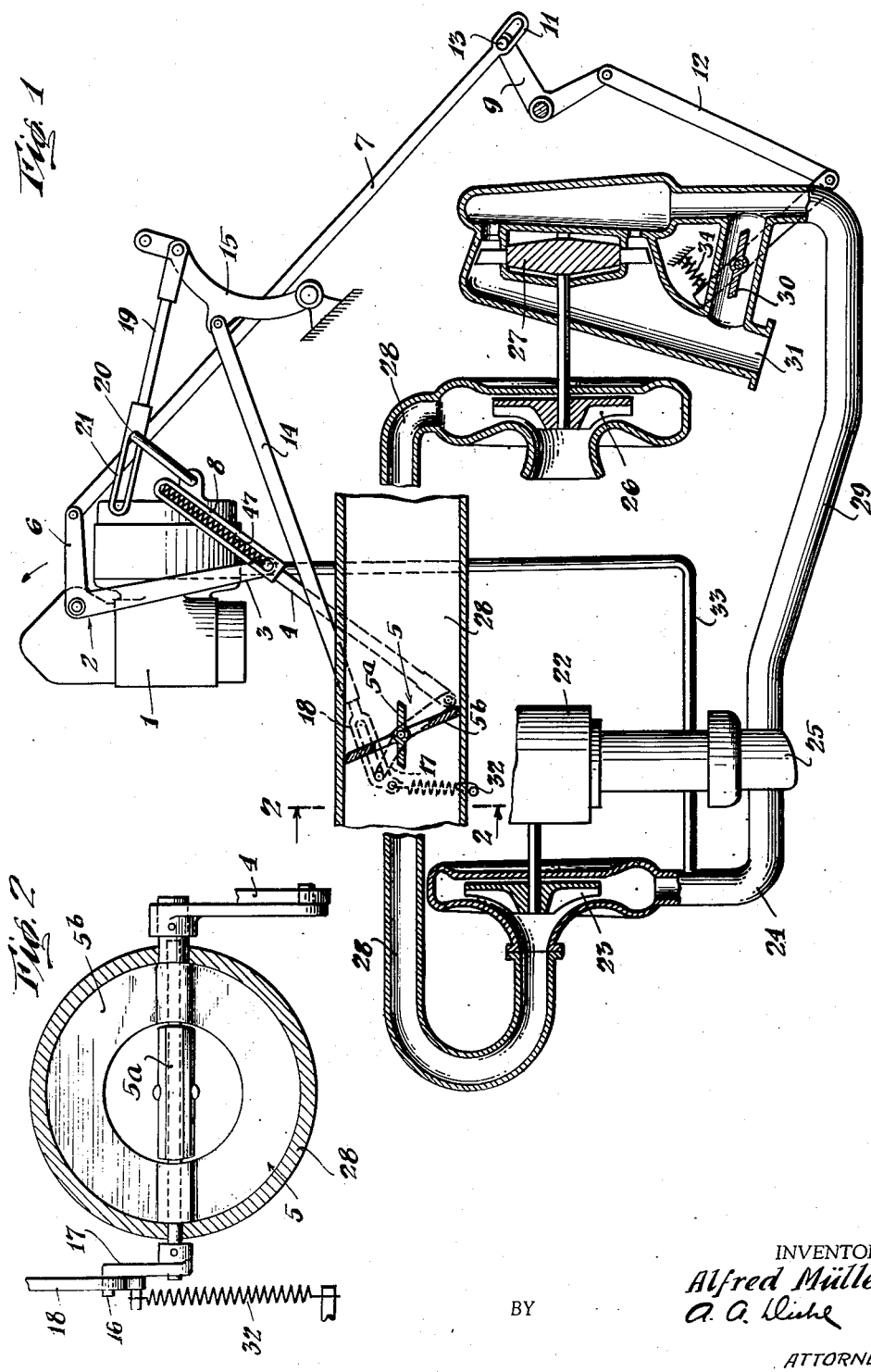

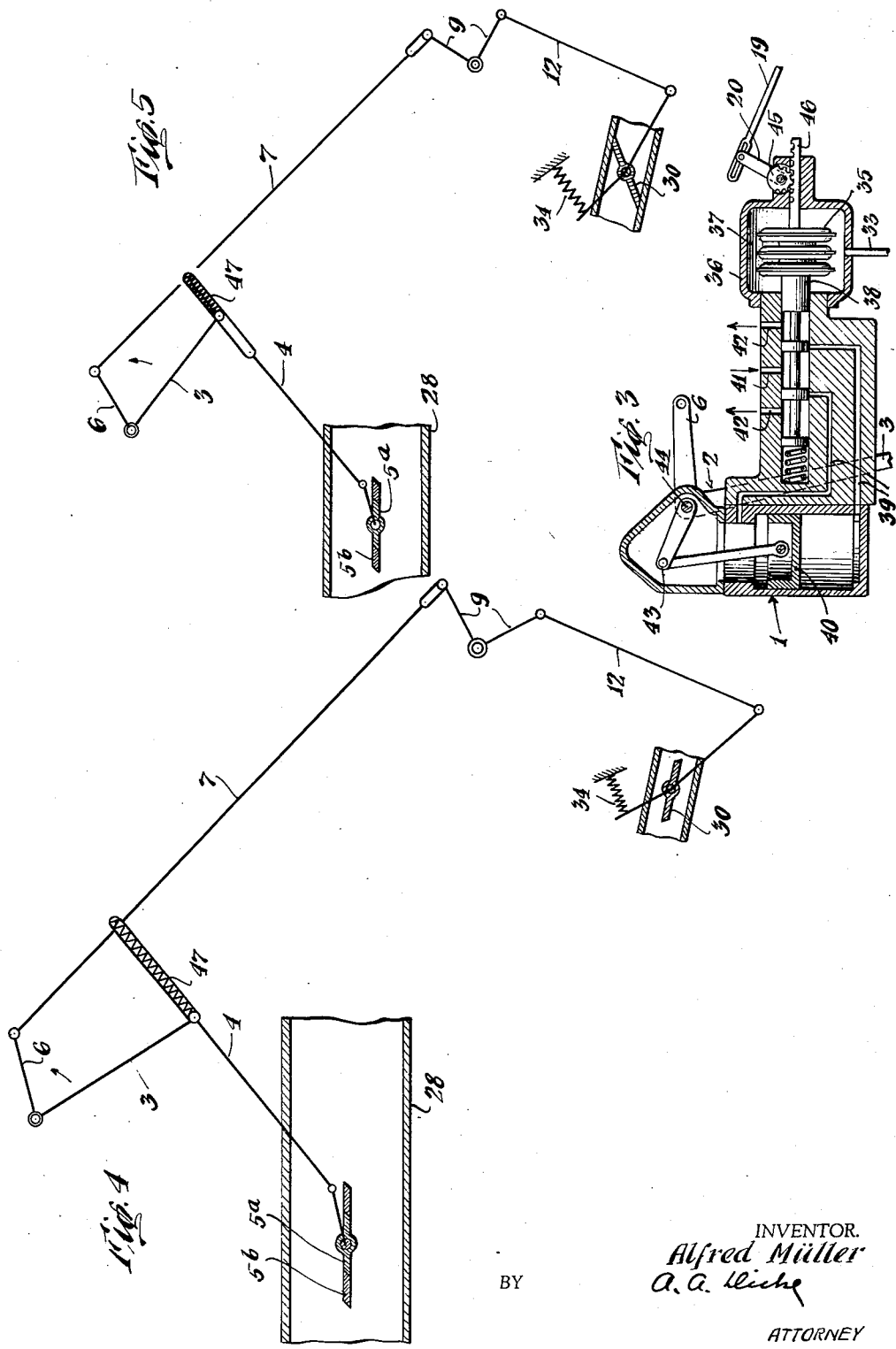

2,297,235

UNITED STATES PATENT OFFICE 2,297,235

CONTROL FOR SUPERCHARGED ENGINES

Alfred Müller, Munich, Germany; vested in the Alien Property Custodian

Application February 3, 1939, Serial No. 254,426
In Germany February 3, 1938

16 Claims. (Cl. 60—13)

The invention relates to the regulation of a supercharged engine, and more particularly such in which the charge up to a predetermined height of flight is compressed by a supercharger driven by the engine and beyond this also by means of a supercharger driven by an exhaust gas turbine.

The regulation is preferably effected automatically by a single pressure responsive device, and is so arranged that the impinging of the turbine and thus the operation of the blower is only effected beyond a predetermined height of flight. Up to this height the output of the engine is regulated by an output throttle flap which is influenced by the same pressure regulator as that which also regulated the output of the blower by the adjustment of a corresponding impinging of the turbine. This output throttle flap controls the amount of air delivered by the supercharger driven by the engine, while the pressure delivered by this supercharger and which is dependent on the opening position of the output throttle, is determinative of the output produced by the engine. When the output throttle flap is opened fully or approximately fully by the charging pressure regulator, a second supercharger, driven by the exhaust gas turbine, delivers a higher charging pressure which enables the output to be maintained at a higher height of flight. The exhaust gas blower thus delivers already pre-compressed air to the blower driven by the engine, which is then brought by the latter to the charging pressure finally desired.

According to the invention the regulation operates in such a manner that from the height beyond which the exhaust gas turbine is impinged, that is to say when the output throttle flap is open fully or approximately fully, the influencing of the engine output in combination with the engine driven charging stage is effected exclusively by the charging pressure produced at any time by the blower driven by the exhaust gas turbine. This charging pressure is in turn dependent on the speed of rotation of the turbine which is controlled by the charging pressure regulator.

Other objects will be in part obvious from the annexed drawing and in part indicated in connection therewith by the following analysis of this invention.

This invention accordingly consists in the features of construction, combination of parts, and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as part of this disclosure, and in such drawings:

Fig. 1 is a schematic view generally illustrating the relationship of the various elements of this invention with one another, showing in particular the interconnection of the various parts by the special linkage in accordance with the present invention;

Fig. 2 is a cross-sectional view on an enlarged scale along the line II—II of Fig. 1, illustrating a special type of control valve to be used with the present invention;

Fig. 3 is a cross-sectional view of a pressure-responsive control device which may be used in connection with the present invention;

Fig. 4 is a schematic view of the control linkage forming part of the present invention, showing the relative positioning of the control element after the linkage has been actuated; and Fig. 5 is a schematic view of the control linkage, showing the control parts in still another control position.

Fig. 1 illustrates an engine 22, which may be an aircraft engine, controlled in the first instance by a throttle valve 5 in the air supply. According to the altitude of the engine, the combustion air is either supplied by the supercharger 23 driven from the crankshaft of the engine 22 and guided through a charging conduit 24 to the individual cylinders 25, or the air is precompressed by a second supercharger 26 driven by an exhaust gas turbine 27. In this case, the pre-compressed air is conducted to the supercharger 23 by the conduit 28, and a further compression then takes place. The conduit 29 is used to guide the exhaust gas from the cylinder 25 to the exhaust gas turbine 27. Conduit 29 is preferably provided with an opening 31 which is controlled by a valve 30 in such a manner that when the opening 31 is clear the exhaust gases pass directly out into the atmosphere, in which case there will be no impingement of the same upon the exhaust gas turbine 27. A gradual closing of the valve 30, on the other hand, increases the amount of gas flowing to the turbine 27, while the amount of escaping gas is decreased. When the valve 30 is entirely closed, the turbine 27 will run at full speed and the supercharger 26 driven thereby will be completely effective.

A pressure regulator 1 of any suitable known character, which may be responsive to the pressure within the charging conduit 24, is used to control both the valves 5 and 30 in a novel manner hereinafter described. For purposes of this control the pressure regulator is preferably provided with a two-armed crank 2, the longer arm 3 of which is connected by a connecting rod 4 with the throttle 5, while the shorter crank arm 6 is connected with the rod 7 controlling the valve 30. The connection between the crank arm 3 and the rod 4 is of such a character that the connecting end of the crank arm 3 moves in a slotted guide 8 formed on the end of the rod 4, while the other end of the rod 4 is directly rotatably attached to an actuating crank of the throttle valve 5. In this connection it is to be noted that valve 5 is normally in its generally closed position, and includes two flaps 5a and 5b, the inner flap 5a being moved to the open position, as illustrated, by a hand lever for starting, in a manner to be described hereinafter. The pressure-responsive device accordingly controls the movement of the outer larger annular flap 5b. The throttle valve flap 5a is urged into its open position by a spring 32, while the outer flap 5b is urged toward an open position by suitable means such as a spring 47 positioned in the slotted guide 8 and reacting on the end of the crank arm 3. If, now, the valve is moved from its closed position by the pressure-responsive device, the crank 3 will have moved from its original position as shown in Fig. 1, to the position indicated in Fig. 4, thus permitting opening of the valve 5. If, due to still further increase in height, the full opening of the valve 5 is insufficient to maintain the necessary supercharger pressure the supercharger 26 driven by the exhaust gas turbine will then be started. Further movement of the pressure-responsive double-arm 2 to bring this about will not affect the control of the valve 5, since, as seen in Fig. 5, the arm 3 will merely slide in the slotted guide 8 against the spring 47, but the shorter crank arm 6, through the connecting rod 7, the double-arm pivoted lever 9, and the rod 12 will act to close the valve 30, thereby increasing the flow of the exhaust gases for impingement upon the turbine 27. The valve 30 is preferably normally urged into its open position by means of suitable spring means 34.

The entire regulation of output is thus effected, as long as the engine is located above the "rated height" (the height at which the engine is designed to operate with maximum efficiency) of the ground charger, in which the output throttle 5 is not moved by the lever arm 3 of the bell crank lever 2 influenced by the charging pressure regulator 1, exclusively by the exhaust gas turbine and/or the height charger driven by this.

It must also be mentioned that the rod mechanism 7 engages with the bell crank lever 9 through a slotted guide 11. In the starting position, that is to say when the output throttle valve 5 is still closed, the slotted guide 11 is located in the position shown in Fig. 1. The hinge bolt 13 on the bell crank lever 9 is thus in the position shown, as the turbine throttle 30 and thus the bell crank lever 9 are held open by pressure of spring 34 until the throttle, through the lever 9 and the rod 12 has gradually been closed against the spring action, by the connecting rod 7. Whilst thus the output throttle 5 is opened slowly, the turbine throttle is always fully open and the rod 7 which has also been moved by the bell crank lever 2 slides with its slotted guide 11 on the bolt 13 until this reaches the outer end of the guide as seen in Fig. 4, and then on further movement slowly closes the turbine throttle as seen in Fig. 5, that is to say produces an impinging of the turbine.

When it is necessary to reduce the charging pressure for the purpose of maintaining the adjusted output, for example when the height of flight decreases, the rod 7 is moved in the opposite direction by the charging pressure regulator 1, whereby the spring pressure, acting on the turbine throttle, causes the bolt 13 of the bell crank lever 9 to remain against the outer end of the guide 11 and thus effect an opening of the turbine throttle until this is again fully open (position shown in Fig. 4). On further regulation in this direction the slotted guide 11 again slides along the bolt 13 and the output throttle valve 5 is gradually further closed by the lever arm 3 through the lever 4.

Further there is provided in combination with the automatic output regulation, according to the invention, by means of a charging pressure regulator, both for regulating the blower driven by the exhaust gas turbine and for regulating the charging pressure up to the ground charger "rated height", also a double influencing of the output throttle valve or a part thereof either directly or through the charging pressure regulator, manually by means of a hand lever, whereby the effective range of the rocking lever for the direct flap movement and for varying the charging pressure regulator adjustment are sequentially arranged. As illustrated in more detail in Fig. 2, the output throttle valve 5 consists for this purpose of an outer annular flap 5b, which is connected to the lever 4 influenced by the charging pressure regulator 1 and an inner solid flap 5a which is connected by the lever 14 to the rocking lever 15 which is actuated manually. The two flaps are so formed that movement of the central flap 5a into the open position by the manually adjustable lever 15 is permitted without disturbing the normally closed position of the outer flap 5b. In this case the manually adjustable flap part 5a serves primarily for influencing the starting of the engine manually, as in this case the charging pressure regulator does not operate correctly until the oil pressure which has sunk whilst the engine was stationary, has again been restored to such an extent that the regulator can overcome the spring forces acting on the flaps in the opening direction.

When moving the rocking lever 15 from its original starting position into the position shown, the hand actuated part 5a of the output throttle valve 5, which at first is completely closed, is opened by a spring 32 and is finally located in the open position when the rocking lever 15 is in the position shown. The bolt 16 connected to the operating lever 17 of the inner throttle flap part is in this case located at the lower edge of the slotted guide 18 of the lever 4 under the pressure of spring 32 acting on the output throttle in the opening direction. When the output throttle valve part actuated manually is fully open, the further output regulation is effected automatically by the charging pressure regulator as is fully explained above.

The regulation in the regulating range influenced by the charging pressure regulator takes place through a rod 19, hinged to the rocking lever 15, which varies the adjustment of the charging pressure regulator through the selecting lever 20. In order to allow a variation of the adjustment of the charging pressure regulator, according to the invention, to take place only after the hand actuated flap part has been fully opened, the rod 19 is connected to the selecting lever 20, on the charging pressure regulator 1, also through a slotted guide 21, so that during the angular movement of the rocking lever 15 from its starting position into the position shown, the rod 19 slides with its slotted guide 21 on the hinge bolt of the selecting lever 20, whilst the lever 20 remains unchanged. Only on further movement of the rocking lever 15 in the counterclockwise direction will the lever 20, which now bears against the inner end of the slotted guide 21, be moved, and thus the charging pressure regulator adjustment is varied manually. During this counterclockwise angular movement of the rocking lever 15 from the position shown, the connecting rod 14, moved therewith, slides in its slotted guide 18, without transmitting its movement.

As previously stated, the pressure-responsive control device 1 for actuating the controlling linkages may be of any suitable type known to the art. A typical control device of the servo-motor type is illustrated in Fig. 3; the servo-motor pressure-responsive device there illustrated is substantially that shown and described in the British Patent 450,587, with only certain slight mechanical changes adapting it for use with applicant's linkage system rather than the different linkage system disclosed in the said British patent. As shown in Fig. 3, the device includes a well-known pressure-responsive metallic bellows 35 mounted within a chamber 37 of a housing 36, to which chamber charging air is led from the charging conduit 24 by means of a suitable pipe 33. Movement of the metallic bellows 35 actuates a multiple piston valve 38 controlling the opening to canal 39 leading above and below the main actuating piston 40. Movement of the multiple piston valve 38 directs oil under pressure to one of the conduits 39 through a port 41, while escaping oil for relieving pressure upon one side of the main piston 40 may pass out through one of the ports 42. A suitable connecting rod linkage 43 rotates the crank arm 3 and 6 about the point 44 upon movement of the piston 40. In the position of the crank arm 3 and 6, which correspond to their position in Fig. 1, and the position of the multiple piston valve 38, it will be seen that upon a decrease in charging pressure the metallic bellows 35 will expand, moving the multiple piston valve 38 to the left. As a result, oil under pressure will be permitted to pass through the upper canal 39 above the piston, while the lower canal 39 will be connected to a discharge port 42. Accordingly the main piston 40 will be pushed downwardly, rotating the arms 6 and 3 in a counterclockwise direction to effect movement of the control rods 4 and 7 (Fig. 1) in a manner previously described to actuate applicant's novel linkage and charging pressure control arrangement. Conversely, if the charging pressure increases, oil under pressure will be admitted below the main piston 40 to restore the crank arms to the original position illustrated. The initial setting of the control device may be varied in a manner previously described by the hand crank 15 and links 19 and 20 which will rotate a small pinion 45 acting upon a rack extension 46 connected to the bellows 35 and multiple piston valve 38. Movement of the rack extension 46 through the hand crank 15, links 19 and 20 and pinion 45 will therefore vary the initial setting of the control device. The control device described in Fig. 3, however, forms, per se, no part of the present invention, but has only been described in connection with the remainder of my novel system.

In summary it may finally also be mentioned that by the total regulation according to the invention it becomes possible to engage the exhaust gas turbine in an advantageous manner, as in fact it is only impinged beyond a predetermined height of flight and then always only so long, for such a length of time and to such a degree as is necessary for maintaining the output. The regulation in the range with and without the blower driven by the exhaust gas turbine is effected by a single charging pressure regulator, for although two entirely separate regulating ranges exist, both ranges are controlled by a common regulator.

While the pressure regulator in accordance with the preferred embodiment of this invention is responsive to the pressure within the charging conduit leading to the internal combustion engine from the constantly running supercharger, it is also possible that this pressure regulator may be responsive to atmospheric pressure, as will at once be apparent to those skilled in this art.

Further by the invention, the difficulties occurring when starting the engine and caused by the lagging of the charging pressure regulator, are obviated as there is provided a manual adjustment which is entirely independent of the charging pressure regulator. In spite of this however, independently of this adjustment, there is provided a variation of the charging pressure adjustment in the usual manner, which is obtained by the construction, according to the invention, of the regulating rod mechanism and the arrangement in series resulting therefrom, of two regulating ranges independently of one another within the entire angle of movement of the manual setting lever.

It will be seen that I have provided a construction which satisfies the objects enumerated above, and while I have shown the invention in a certain physical embodiment, it is to be understood that modifications of the structure shown may be made by those skilled in this art without departing from my invention as expressed in the claims which follow.

I claim:

1. In combination, an internal combustion engine, a first supercharger driven thereby, a conduit for supplying air under pressure from said first supercharger to said internal combustion engine, a second supercharger, means for guiding air from said second supercharger to said first supercharger, an exhaust turbine drivably connected to said second supercharger, means for guiding the exhaust gases from said internal combustion engine to said exhaust turbine, a throttle valve in said air guiding means for controlling the flow of air to said first supercharger, means in said exhaust gas guiding means for controlling the flow of said gas into said exhaust turbine, actuating means responsive to the pressure within said conduit, and means interconnecting said throttle valve and exhaust gas controlling means with said pressure responsive actuating means for gradually opening said throttle valve and after said throttle valve is substantially fully open, then supplying gradually increasing amounts of exhaust gas to said turbine.

2. The combination according to claim 1, in combination with manual means for varying the setting of said pressure responsive actuating means.

3. The combination according to claim 1, in which said throttle valve is formed of two relatively rotating members one, of which is controlled by said pressure responsive actuating means, in combination with manual means for controlling movement of the other member.

4. The combination according to claim 1, in which said throttle valve is formed of two relatively rotatable members, one of which is controlled by said pressure responsive actuating means, in combination with manual means for controlling movement of the other member, means for varying the setting of said pressure responsive device, and linkage means for actuating said varying means by said manual means only after the latter permits movement of the other member to the full opening position.

5. In combination, an internal combustion engine, a first supercharger driven thereby, a conduit for supplying air under pressure from said first supercharger to said internal combustion engine, a second supercharger, means for guiding air from said second supercharger to said first supercharger, an exhaust turbine drivably connected to said second supercharger, means for guiding the exhaust gases from said internal combustion engine to said exhaust turbine, a pivotally mounted throttle valve in said air guiding means for controlling the flow of air to said first supercharger, a pivotally mounted valve in said exhaust gas guiding means for controlling the flow of said gases to said exhaust turbine, a pressure responsive device having a two-arm lever movable in response to changes in pressure within said conduit, means for urging said throttle valve to its open position, a first rod pivotally connected at one end to said throttle valve and on its other end having a slide engaging one of the arms of said two-arm lever in such a manner that said pressure responsive device permits movement of said throttle valve under the force of said spring to a full open position, while further motion of said one arm of said device is freely permitted in said slide, a second rod pivotally connected at one end to the other arm of said two-arm lever, and at its other end provided with a slide, and linkage means pivotally connected at one end with said exhaust gas controlling valve and at its other end engaging said last slide in such a manner that actuation of said valve is not effected by said second rod until said pressure responsive device and said two-arm lever has moved to permit substantially full opening of said throttle valve.

6. The combination according to claim 5, in combination with manual means for varying the setting of said pressure responsive device.

7. The combination according to claim 5, in which said throttle valve is formed of two relatively rotatable members, one of which is controlled by said pressure responsive device, in combination with manual means for controlling movement of the other member.

8. The combination according to claim 5, in which said throttle valve is formed of two relatively rotatable members, one of which is controlled by said pressure responsive device, in combination with manual means for controlling movement of the other member, means for varying the setting of said pressure responsive device, and linkage means for actuating said varying means by said manual means only after the latter permits movement of the other member to the full opening position.

9. The combination according to claim 5, in which said throttle valve is formed of solid inner and annular outer relatively rotatable members, and said first rod is connected to the outer member for control thereof, in combination with a pivotally mounted manually operated lever, and linkage means interconnecting said lever and said inner member for controlling movement of the same.

10. The combination according to claim 5, in which said throttle valve is formed of solid inner and annular outer relatively rotatable members, said rotatable members having cooperating surfaces engageable in such a manner that the outer member may be moved in the throttle-closing direction independently of the position of the inner member, but is limited in the throttle-opening direction by the engagement of said cooperating surfaces while said inner member may be moved in the throttle-opening direction independently of the position of the outer member, but is limited in the throttle-closing direction by the engagement of said co-operating surfaces, said pressure responsive means being connected to said outer member, and manual means for closing said inner member.

11. The combination according to claim 5, in which said throttle valve is formed of solid inner and annular outer relatively rotatable members, and said first rod is connected to the outer member for control thereof, in combination with a pivotally mounted manually operated lever, a crank arm for rotating said inner member, and a third rod having a slotted guide at one end engaging said crank arm, and pivotally connected at its other end to said lever.

12. The combination according to claim 5, in which said throttle valve is formed of solid inner and annular outer relatively rotatable members, and said first rod is connected to the outer member for control thereof, in combination with a pivotally mounted manually operated lever, a crank arm for rotating said inner member, a third rod having a slotted guide at one end engaging said crank arm and pivotally connected at its other end to said lever, means for adjusting said pressure responsive device including a second crank arm, and a fourth rod having a slotted guide at one end engaging said second crank arm, and pivotally connected at its other end to said lever.

13. In combination, an internal combustion engine, a supercharger, a conduit for supplying air under pressure from said supercharger to said engine, valve means in said conduit comprising two relatively rotatable inner and outer valve flaps, an actuating device responsive to the pressure within said conduit, linkage means for connecting said actuating device to the outer flap, means for adjusting said pressure responsive device, and manual means for controlling said inner flap and for controlling said adjusting means only after the inner flap has been moved to substantially full open position.

14. The combination according to claim 13, in which said inner flap and said adjusting means are provided with control crank arms, and said manual means includes a single control lever, and a pair of rods each pivotally connected at one end to said lever and on their other end having a slotted guide respectively engaging the crank arm on said inner flap and said adjusting means.

15. The combination according to claim 1, in which said throttle valve is formed of two relatively rotating members, manual means for moving one of said members in the throttle-opening direction for starting of the engine, the other of said members then being controlled for movement by said pressure responsive actuating means through said interconnecting means.

16. The combination according to claim 5, in which said throttle valve is formed of two relatively rotating members, manual means for moving one of said members in the throttle-opening direction for starting of the engine, the other of said members then being controlled for movement by said pressure responsive actuating means through said first rod and two-armed lever.

ALFRED MÜLLER.